United States Patent [19]
Jung

[11] Patent Number: 5,634,665
[45] Date of Patent: Jun. 3, 1997

[54] FUEL TANK MOUNT FOR A FORKLIFT TRUCK

[75] Inventor: Kwon H. Jung, Incheon, Rep. of Korea

[73] Assignee: Daewoo Heavy Industries Ltd., Incheon, Rep. of Korea

[21] Appl. No.: 520,587

[22] Filed: Aug. 30, 1995

[30] Foreign Application Priority Data

Aug. 30, 1994 [KR] Rep. of Korea ............... 94-21618

[51] Int. Cl.⁶ .................................................. B60P 3/22
[52] U.S. Cl. .................................................. 280/834
[58] Field of Search ............................... 280/830, 831, 280/832, 834

[56] References Cited

U.S. PATENT DOCUMENTS

| | | | |
|---|---|---|---|
| 2,354,438 | 7/1944 | Craig | 280/830 |
| 2,376,336 | 5/1945 | Brown | 280/830 X |
| 3,790,183 | 2/1974 | Price | 280/834 |
| 4,025,080 | 5/1977 | Gedeon | 280/834 |
| 5,330,031 | 7/1994 | Hill et al. | 280/834 X |

*Primary Examiner*—Kevin Hurley
*Attorney, Agent, or Firm*—Lowe, Price, LeBlanc & Becker

[57] ABSTRACT

A fuel tank mount for a forklift truck is adapted to mount the fuel tank on a counterweight in a manner that the fuel tank can be removed from an in-use position to an out-of-use position assuring an obstacle-free opening of a hood. The fuel tank mount includes a fixed plate attached to the counterweight; a pair of spaced-apart, parallel guide rails secured to the fixed plate to extend in a lengthwise direction of the forklift truck, each of the guide rails having a slot which runs substantially over a full length thereof; a movable plate supporting the fuel tank thereon, the movable plate provided with a pair of legs slidably fitted into the slot of the guide rails, the movable plate capable of sliding movement with respect to the fixed plate between a first position corresponding to the in-use position of the fuel tank and a second position corresponding to the out-of-use position; and a lock mechanism for releasably locking the movable plate in the first position against relative sliding movement to the fixed plate.

18 Claims, 7 Drawing Sheets

FUEL TANK MOUNT FOR A FORKLIFT TRUCK

FIELD OF THE INVENTION

The present invention is generally directed to a device whereby a fuel tank of cylindrical configuration can be replaceably mounted on and above a counterweight of an engine-driven forklift truck. More specifically, the invention pertains to a fuel tank mount for such a forklift truck using, e.g., liquified petroleum gas as its fuel, which enables the fuel tank to be removed backwardly into a position wherein an engine hood can be freely openable with no fear of physical interference with the fuel tank.

DESCRIPTION OF THE PRIOR ART

As is generally known, a conventional forklift truck includes a vehicle frame supported by wheels, a mast attached to the front edge of the vehicle frame, a pair of forwardly projecting forks carried by the mast for elevational movement along the latter to raise and lower loads, and a counterweight located at the rear edge of the vehicle frame for retaining balance of the forklift truck as a heavyweight load is lifted up by the forks. Mounted substantially at the center of the vehicle frame is an engine which will be kept covered with a hood or bonnet. The hood should be pivoted backwardly into an open position to reveal the engine, in the event that there occurs a need to repair same. A driver's seat is fixedly secured to the hood and surrounded by an overhead guard to define a cabin of the forklift truck. In case of a LPG-fueled forklift truck, it is necessary to replaceably mount a fuel tank onto the counterweight in a manner that the fuel tank lies on its side and is tied up with a bander. At the time when the fuel will have been used up, the bander is untied to replace the fuel tank with a new one.

The fuel tank mounted on the counterweight in this way will often become an obstacle against which the hood may collide as it is being pivoted into an open position, thus heavily restricting the opening angle of the hood. Particularly, the driver's seat is highly likely to interfere with the fuel tank during the process of backward pivotal movement of the hood. To assure that the hood be opened to its full opening angle, therefore, it is required to remove the fuel tank beforehand into a position wherein no physical interference may take place between the hood and the fuel tank.

Conventionally, use has been made of a fold-back type fuel tank mount that enables a fuel tank to be moved rearwardly from a home position to a remote position in advance of a hood being opened. The fold-back type fuel tank mount comprises a fixed bracket attached to a counterweight of the forklift truck, a pivotable bracket lying above the fixed bracket and having a bander with which the fuel tank is tied up, a hinge for coupling the pivotable bracket to the fixed bracket and a latch adapted to either allow or prohibit a pivotal movement of the pivotable bracket with respect to the fixed bracket. In operation, pulling backward the fuel tank with the latch released will cause the pivotable bracket to turn rearwardly about the hinge so that the fuel tank is removed into the remote position to permit a full opening of the hood without getting collided against the fuel tank. At the termination of engine repair and maintenance, the hood is closed to hide the engine thereunder, after which the pivotable bracket will be pivoted forwardly about the hinge to bring the fuel tank into the home position.

Due mainly to the heavyweight nature of the fuel tank, the prior art fuel tank mount stated above tends to pose a drawback that, in the process of removing the fuel tank, a significant magnitude of mechanical shock would occur, with the result of parts or components being subjected to deformation and even breakage. Another disadvantage of the conventional fuel tank mount is that the operator should put forth a great strength to move the pivotable bracket and the heavy fuel tank rearwardly and forwardly.

SUMMARY OF THE INVENTION

Accordingly, it is an object of the invention to provide a fuel tank mount for a forklift truck which can eliminate the deficiencies inherent in the prior art device and which enables the fuel tank to be relocated into an out-of-use position with no fear of deformation or breakage of components and in an effortless fashion, so that a hood can be opened to its full opening angle without the fuel tank being a hindrance in the opening process of the hood.

With this object in view, the present invention resides in the provision of a fuel tank mount for a forklift truck adapted to mount the fuel tank on a counterweight in a manner that the fuel tank can be removed from an in-use position to an out-of-use position assuring an obstacle-free opening of a hood, comprising: a fixed plate attached to the counterweight; a pair of spaced-apart, parallel guide rails secured to the fixed plate to extend in a lengthwise direction of the forklift truck, each of the guide rails having a slot which runs substantially over a full length thereof; a movable plate supporting the fuel tank thereon, the movable plate provided with a pair of legs slidably fitted into the slot of the guide rails, the movable plate capable of sliding movement with respect to the fixed plate between a first position corresponding to the in-use position of the fuel tank and a second position corresponding to the out-of-use position; and lock means for releasably locking the movable plate in the first position against relative sliding movement to the fixed plate.

BRIEF DESCRIPTION OF THE DRAWINGS

Other objects, features and advantages of the invention will become apparent from the following description of the preferred embodiments taken in conjunction with the accompanying drawings, in which.

DETAILED DESCRIPTION OF THE PREFERRED EMBODIMENT

Figure 1:
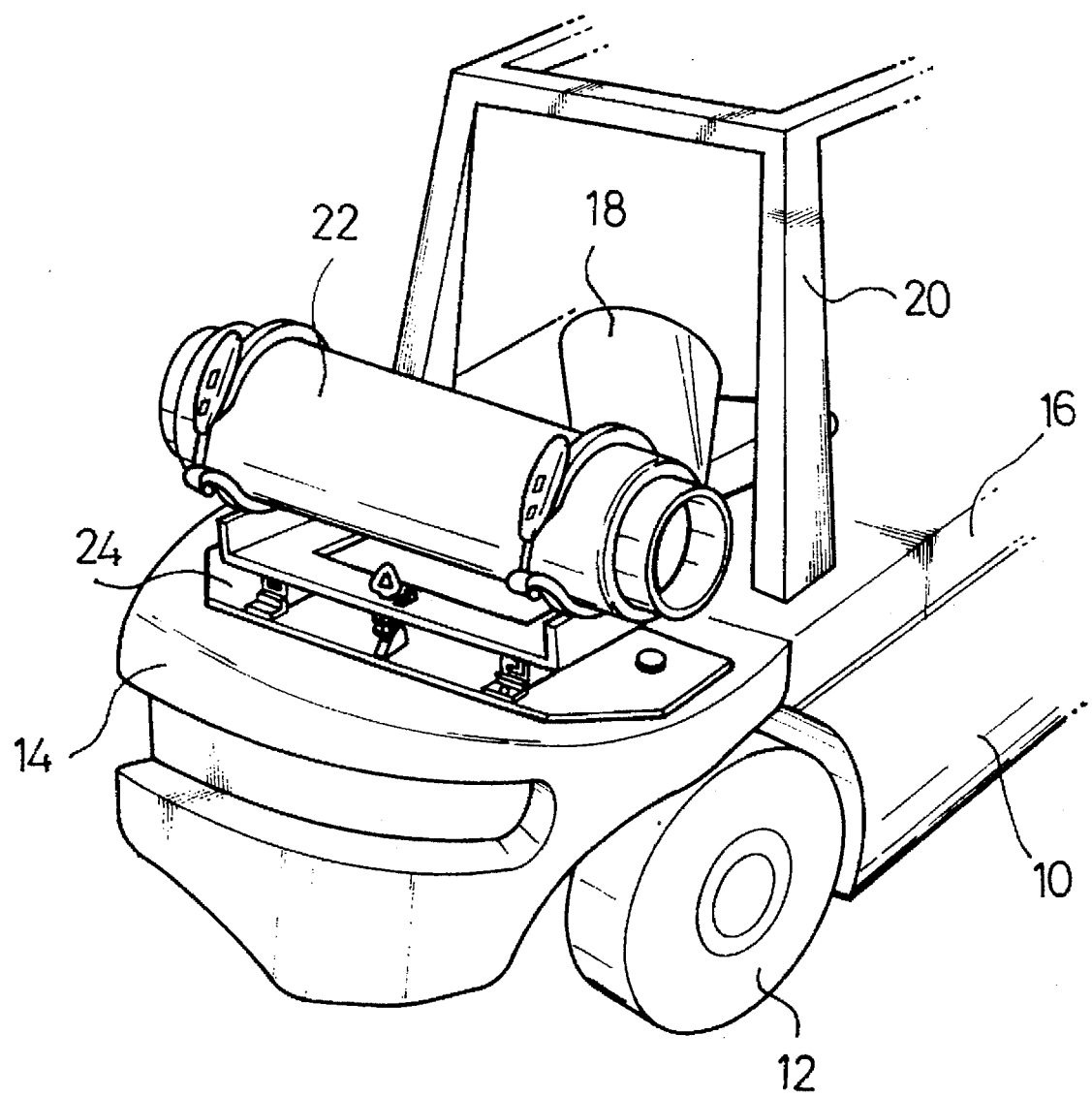
FIG. 1 is a partial perspective view showing the rear part of the forklift truck employing a slide type fuel tank mount in accordance with the first embodiment of the invention.

Referring now to FIG. 1, there is depicted by way of example the rear part of an engine-driven forklift truck which employs a fuel tank mount in accordance with the first embodiment of the invention. The forklift truck includes a vehicle frame 10 supported by wheels 12 and a counterweight 14 attached to the rear end of the vehicle frame 10 for maintaining balance of the forklift truck when a heavyweight load is raised or lowered with the use of forwardly projecting forks not shown in the drawings. An engine using, e.g., liquified petroleum gas as its fuel, is mounted substantially at the center of the vehicle frame 10 to produce torque required in the forklift truck. The engine, not illustrated for simplicity, is covered with a hood 16 that will normally be kept in a closed position as depicted in FIG. 1. It should be noted that the hood 16 can be backwardly opened about its pivot axis into an open position to provide access to the engine for repair or maintenance. In addition, a driver's seat 18 is fixedly secured to the hood 16 and surrounded by an overhead guard 20 that defines a cabin of the forklift truck. To supply the engine with fuel, it is usually required to replaceably mount a fuel tank 22, e.g., a portable LPG reservoir of cylindrical configuration, on and above the counterweight 14 by use of a suitable mounting device 24.

Figure 2:
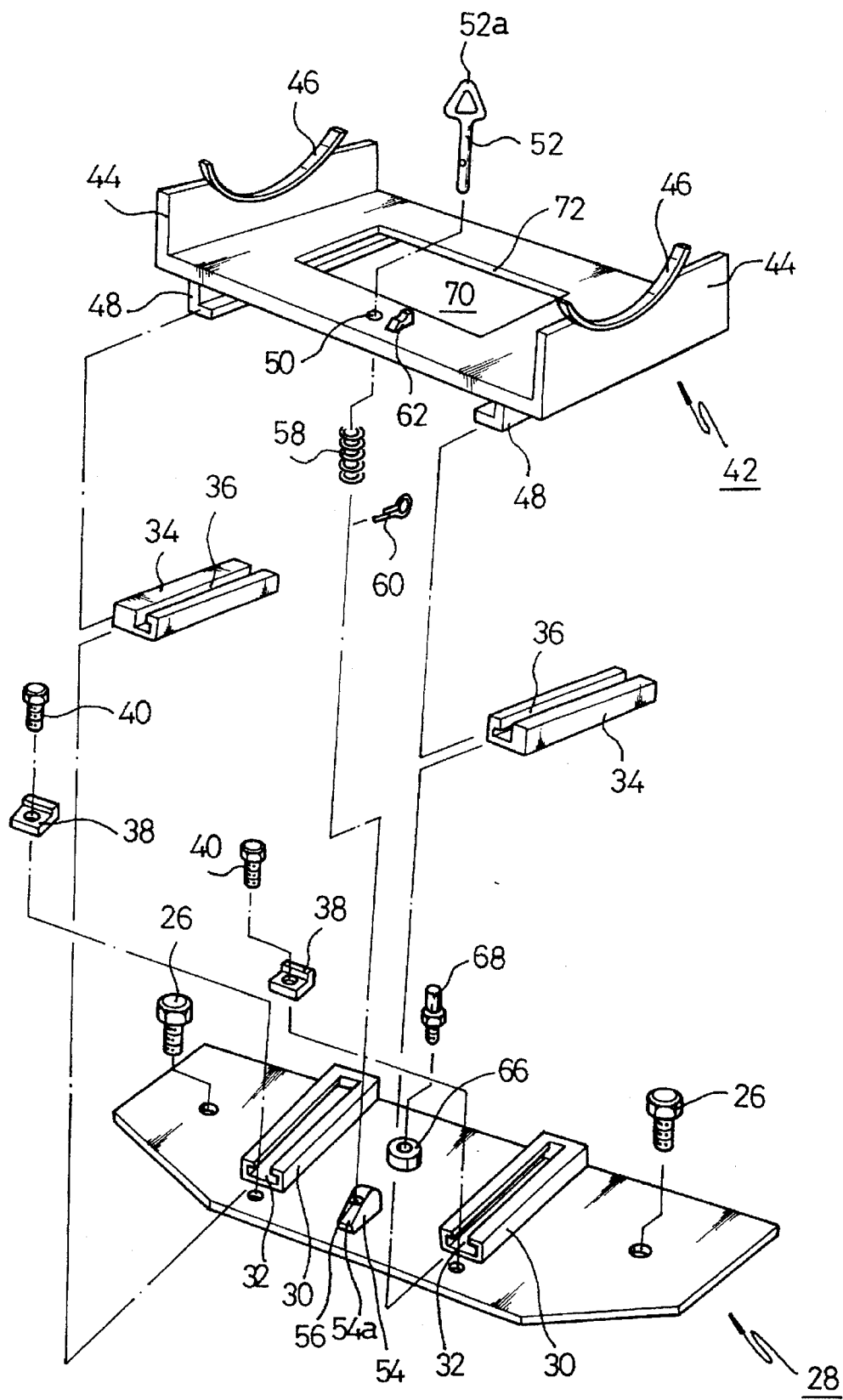
FIG. 2 is an exploded perspective view illustrating in greater detail the fuel tank mount of the first embodiment.

FIG. 2 shows in detail a slide type fuel tank mount in accordance with a first embodiment of the invention. The fuel tank mount is designed to remove, when necessary, the fuel tank 22 from an in-use position to an out-of-use position whenever the engine needs to be repaired, checked or overhauled. As used herein, the term "in-use position" is intended to mean a front position wherein the fuel tank 22 remains adjacent to the hood 16 to possibly restrict a pivotal opening thereof, and the term "out-of-use position" denotes a rear position wherein the fuel tank 22 is relocated far away from the hood 16 to permit an obstacle-free opening thereof.

As shown in FIG. 2, the fuel tank mount comprises a fixed plate 28 attached to the counterweight 14 by means of a bolt 26 or other suitable fasteners. Fixedly secured on the fixed plate 28 as by welding are a pair of laterally spaced-apart, parallel guide rails 30, each of which has a generally "T"-shaped slot 32 extending in the lengthwise direction of the forklift truck. It is preferred that a bushing 34 with a longitudinal slide groove 36 of "L"-shape be held in the slot 32 of the respective guide rail 30. The bushing 34 may preferably be made of relatively soft material, for instance, synthetic resin or engineering plastic, which exhibits an enhanced lubricating property and a low frictional resistance. Near the rear end of the respective guide rail 30, a retainer block 38 may be affixed to the fixed plate 28 as by a screw 40 to prevent an unwanted removal of the bushing 34 from the slot 32.

Placed on the guide rails 30 is a movable plate 42 that can be subjected to a sliding movement between a first position corresponding to the in-use position and a second position corresponding to the out-of-use position of the fuel tank. The movable plate 42 is provided with a pair of lateral support frames 44 which extend vertically upwards in the vicinity of the flank sides of the movable plate d2. Each of the lateral support frames 44 has a bander 46 adapted to tie up the fuel tank replaceably. The movable plate 42 is further provided on its underside with a pair of spaced-apart, parallel legs 48 each having a substantially "L"-shaped cross-section. It should be understood that each of the legs 48 is fitted into the slide groove 36 of the bushing 34 for sliding movement therealong in response to a displacement of the movable plate 42 relative to the fixed plate 28.

Figure 3:
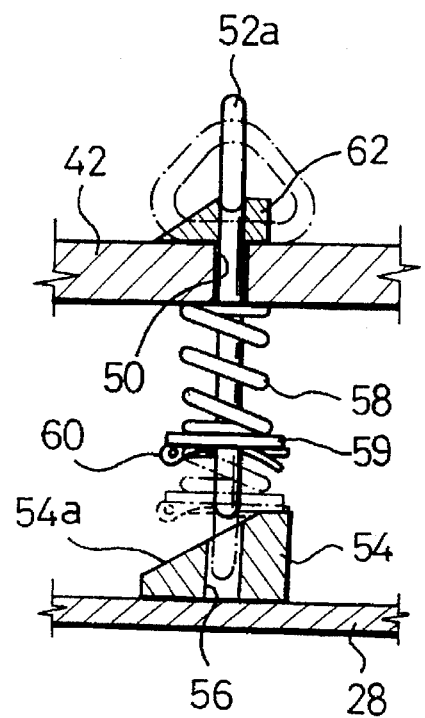
FIG. 3 shows a lock mechanism which releasably locks a movable plate with respect to a fixed plate, with a solid line indicating a lock pin in its released position and a phantom line representing the lock pin in its locked position.

The movable plate 42 can be releasably locked relative to the fixed plate 28 in the first position by means of a lock mechanism. As best illustrated in FIG. 3, the lock mechanism includes a lock pin 52 snugly fitted through a pin hole 50 pierced in the movable plate 42 and a lock block 54 protruding upwardly from the fixed plate 28. The lock block 54 has a lock hole 56 formed beneath and in a coaxial alignment with the lock pin 52. A compression spring 58 is utilized to resiliently urge the lock pin 52 into engagement with the lock hole 56 of the lock block 54. The lock pin 52 is provided with a knob-like head 52a which will lie above the movable plate 42 when the lock pin 52 is inserted through the pin hole 50. In addition, a split pin 60 is removably fitted across the lock pin 52 with a washer 59 placed thereon to retain the compression spring 58 between the movable plate 42 and the split pin 60 such that the lock pin 52 can be biased downwardly by the compression spring 58.

In the immediate vicinity of the pin hole 50, a head rest block 62 extends vertically upwards a short distance to optionally support the head 52a of the lock pin 62 apart from the movable plate 42. The head rest block 62 is so shaped and sized that, when the lock pin 52 is pulled away from the lock block 54 and then rotated about its axis to a given angular position, e.g., right angle position, the head 52a of the lock pin 52 can bear against the head rest block 62 to thereby keep the lock pin 52 disengaged with the lock hole 56 of the lock block 54. The lock block 54 may have a cam surface 54a with which the lock pin 52 comes into contact at its tip during a final process of sliding movement of the movable plate 42 toward the first position. The cam surface 54a is so inclined as to gradually push up the lock pin 52 against the compression spring 58 until and unless the lock pin 52 reaches the lock hole 56 at the end of the forward sliding movement of the movable plate 42.

In the illustrated embodiment, the fuel tank mount includes a stopper arrangement which plays a role in inhibiting the movable plate 42 from backward sliding movement past the second position to prevent any detachment of the movable plate 42 out of the guide rails 30. As shown in FIG. 2, the stopper arrangement includes a detent bolt 68 threadedly engaged with a boss 66 protruding from the fixed plate 28 and a detent surface 72 forming the front side of a rectangular aperture 70 provided in the movable plate 42. The height of the detent bolt 68 is such that the detent bolt 68 can pass through the aperture 70 of the movable plate 42 when the fixed and movable plates 28, 42 are combined together. This will assure that the detent surface 72 should come into abutment to the detent bolt 68 at the end of backward sliding movement of the movable plate 42, thus restraining any further movement of the movable plate 42 past the second position.

Figure 4:
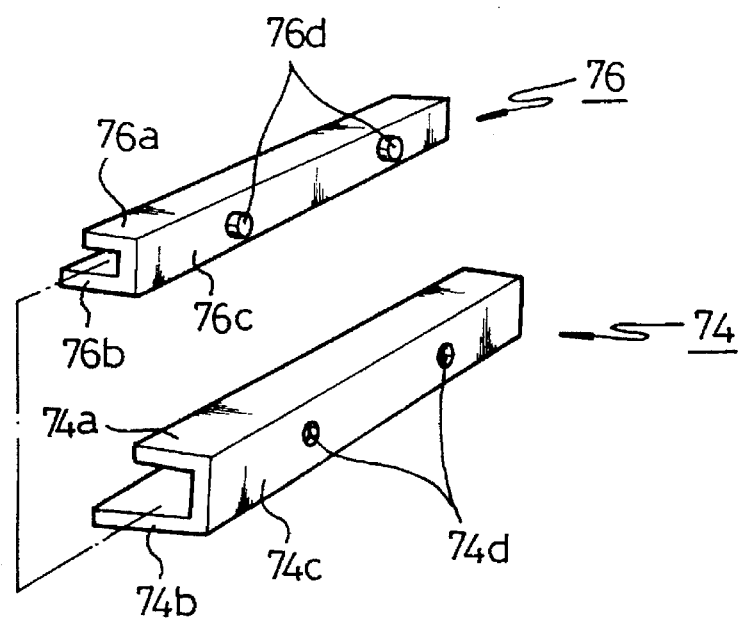
FIG. 4 shows, in perspective, a modification of guide rails and a bushing located within each of the guide rails.

Referring to FIG. 4, a modification of the guide rails and the bushing is shown wherein each of the guide rails 74 has a top flange 74a, a bottom flange 74b extending in a spaced-apart, parallel relationship with respect to the top flange 74a and a vertical wall 74c interconnecting both flanges 74a, 74b together. The vertical wall 74c is provided with a couple of through-holes 74d and the top flange 74a is of somewhat narrower width than the bottom flange 74b. The top flange 74a, the bottom flange 74b and the vertical wall 74c cooperate to define a slot therebetween into which a bushing 76 is held immovably. Like the guide rails 74, the bushing 76 has a top flange 76a, a bottom flange 76b extending in a spaced-apart, parallel relationship with respect to the top flange 76a and a vertical wall 76c interconnecting both flanges 76a, 76b together. The vertical wall 76c is provided with a couple of projections 76d which will be closely fitted into the through-holes 74d of the guide rails 74. It should be noted that the bushing 76 will slidably receive the left-handed leg 48 of the movable plate 42 in FIG. 2.

Figure 5:
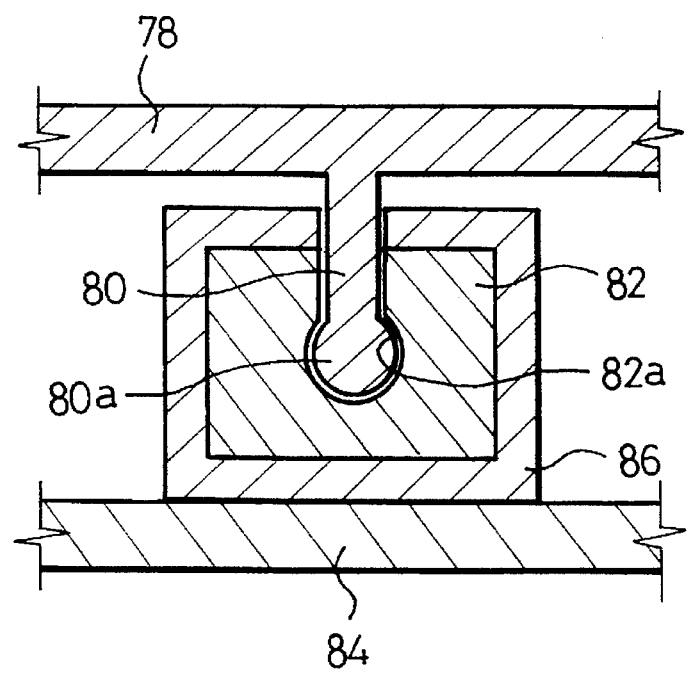
FIG. 5 is a partially cut-away sectional view showing one variant of the movable plate and the bushing.

FIG. 5 shows one variant of the legs and the bushing wherein each leg 80 of the movable plate 78 has a free end 80a of generally circular cross-section and the bushing 82 has a slide groove 82a complementary to the free end 80a of the respective leg 80. The guide rails 86 remain unchanged in their configuration and therefore are identical to those guide rails as illustrated in FIG. 2.

Figure 6:
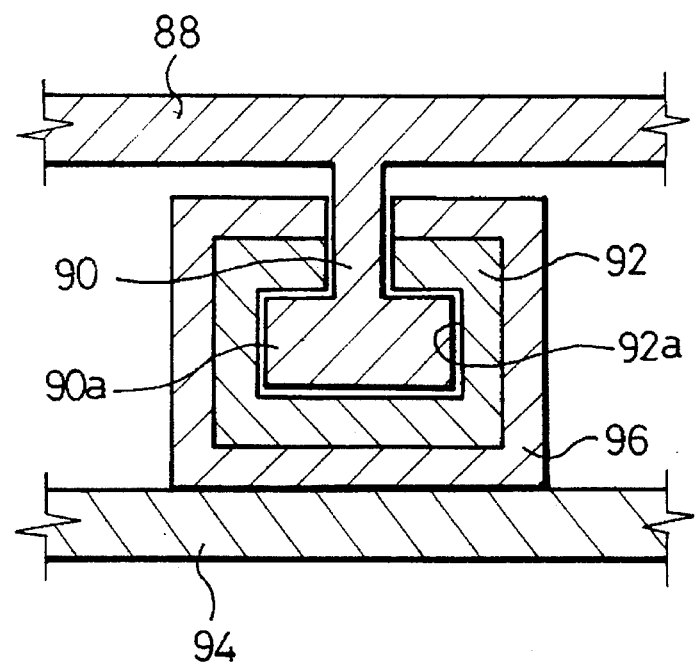
FIG. 6 is a view similar to FIG. 5 but illustrating another variant of the movable plate and the bushing.

FIG. 6 depicts another variant of the legs and the bushing wherein each leg 90 of the movable plate 88 has a free end 90a of generally rectangular cross-section and the bushing 92 has a slide groove 92a complementary to the free end 90a of the respective leg 90. The guide rails 96 remain unchanged in their configuration and therefore are identical to those guide rails as illustrated in FIG. 2.

Operation of the fuel tank mount shown in FIG. 2 will now be set forth in detail. Normally, the movable plate 42 is set to the first position to keep the fuel tank in the in-use position. Under that state, the lock pin 52 is in an engagement with the lock hole 56 of the lock block 54, as indicated by a phantom line in FIG. 3, to prohibit the possibility of the movable plate 42 being inadvertently displaced out of the first position during regular operation of the forklift truck.

In the event that the engine should require a repair or maintenance, the lock pin 52 is manually pulled upwards out of the engagement with the lock hole 56 and subsequently rotated about its axis into a right angle position, as indicated by a solid line in FIG. 3. Releasing the lock pin 52 in this position will allow the head 52a thereof to be seated on the head rest block 62, with the tip of the lock pin 52 removed from the lock hole 56 of the lock block 54. The movable plate 42 is then pulled rearwardly to move from the first position to the second position along the guide rails 30. This will cause the fuel tank tied up with the bander 46 on the movable plate 42 to be brought into the out-of-use position. At the end of such backward sliding movement of the movable plate 42, the detent surface 72 thereof will come into abutment to the detent bolt 68 on the fixed plate 28, making sure that the movable plate 42 does not overrun past the second position, which would otherwise lead to the movable plate 42 being detached from the guide rails 30.

Once the fuel tank 22 is removed into the out-of-use position in this way, the hood 16 can be opened to its full opening angle without encountering any obstacle whereby the engine becomes accessible from the outside. After the engine repair or maintenance has been carried out, the hood 16 should be closed to the original position in order to have the fuel tank 22 returned to the in-use position. Reinstatement of the fuel tank can be effected by way of pushing the movable plate 42 in a forward direction. If the movable plate 42 is forwardly pushed with the lock pin 52 located in the lowermost position as in FIG. 3, the lock pin 52 will make a friction contact with the cam surface 54 during the final interval of the forward sliding movement of the movable plate 42. As the movable plate 42 is subjected to a further sliding movement in this condition, the lock pin 52 is gradually pushed upwards by the cam surface 54 until it meets with the lock hole 56 and comes into engagement therewith. As a result, the movable plate 42 will be locked in the first position to stably maintain the fuel tank in the in-use position.

Figure 7:
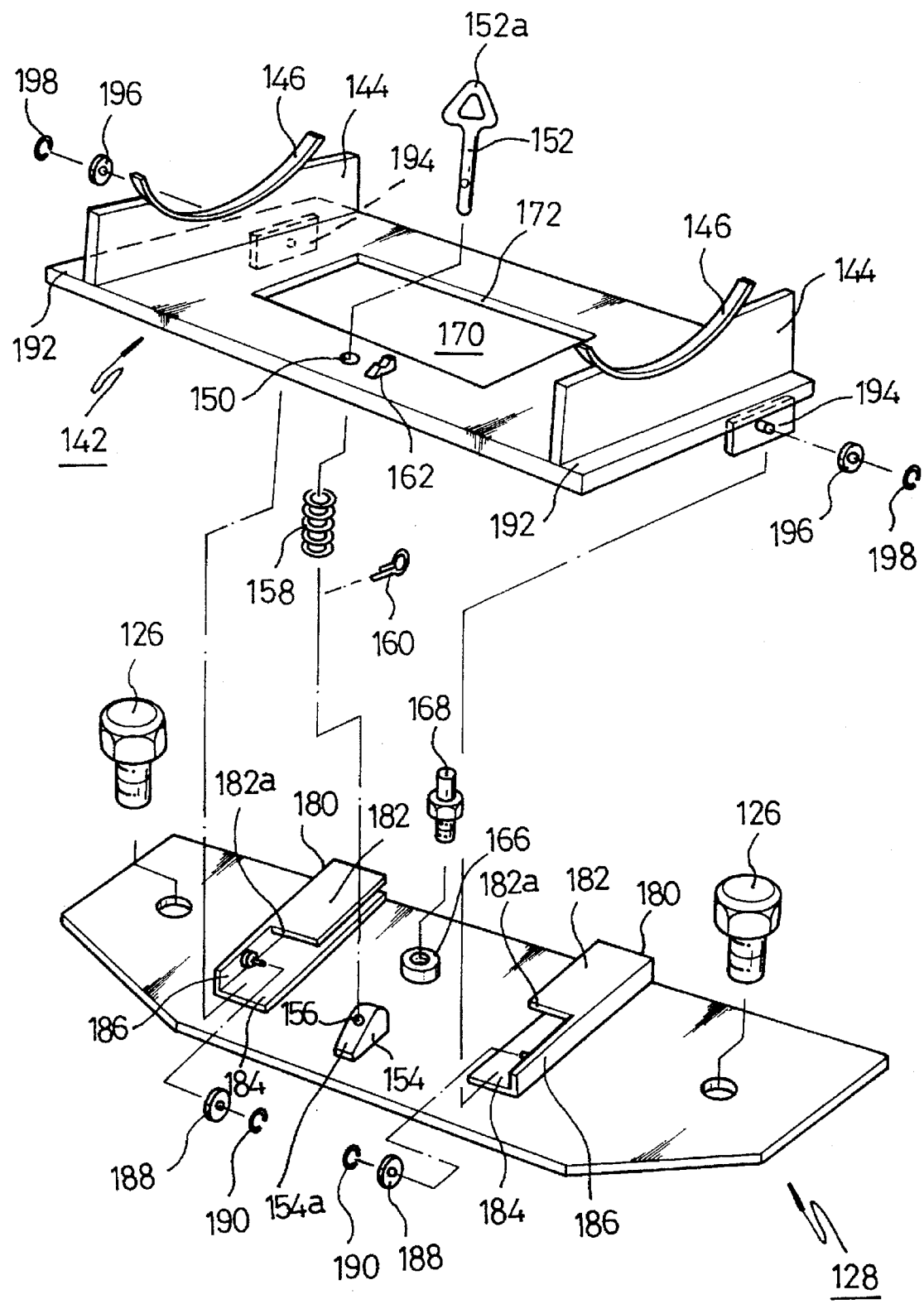
FIG. 7 is an exploded perspective view showing a roller type fuel tank mount in accordance with the second embodiment of the invention.

Turning to FIG. 7, there is shown a roller type fuel tank mount in accordance with the second embodiment of the invention, wherein like parts or components are designated by the same reference numerals as used in FIG. 2 with the exception of adding one hundred thereto. It will suffice to explain only the components that cannot be found in FIG. 2 or whose configuration has been changed.

The roller type fuel tank mount includes, among other things, a pair of guide rails 180 secured to a fixed plate 128 in a spaced-apart, parallel relationship with each other. Each of the guide rails 180 is provided with a top flange 182 having a cutout 182a at its rear side, a bottom flange 184 extending in parallel to the top flange 182 with a spacing therebetween and a vertical wall 186 interconnecting both flanges 182, 184 together, the vertical wall carrying at its rear end portion a stationary roller 188 rotatably held in place by a snap ring 190.

Meanwhile, a movable plate 142 is assembled to the guide rails 180 for sliding movement between a first, forward position and a second, backward position. The movable plate 142 is provided with a pair of lateral flanges 192 extending a bit outwardly from lateral support frames 144 and a pair of legs 194 attached to the underside of the movable plate 142 near the frontal edge of the movable plate 142. Each of the legs 194 is designed to carry a moving roller 196 held in place by a snap ring 198.

Figure 8:
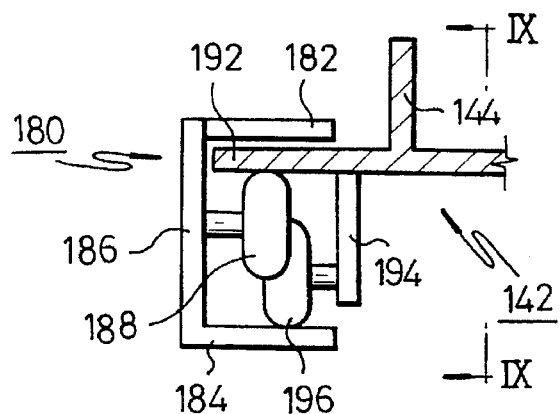
FIG. 8 is a partial view showing one of the guide rails and the movable plate illustrated in FIG. 7 but slidably assembled with each other.

As best shown in FIG. 8, the respective lateral flange 192 and the individual leg 194 of the movable plate 142 are inserted through a slot defined between the top and bottom flanges 182, 184 of the guide rail 180.

Figure 9:
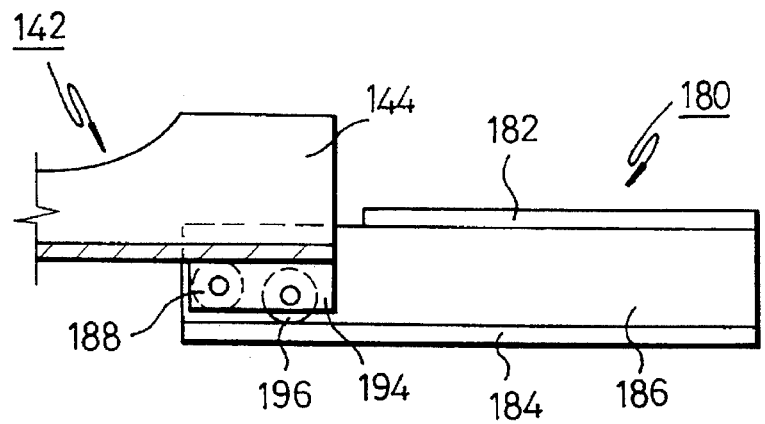
FIG. 9 is a sectional view taken along line IX—IX in FIG. 8 and illustrating the movable plate removed backwardly into a second position.
Figure 10:
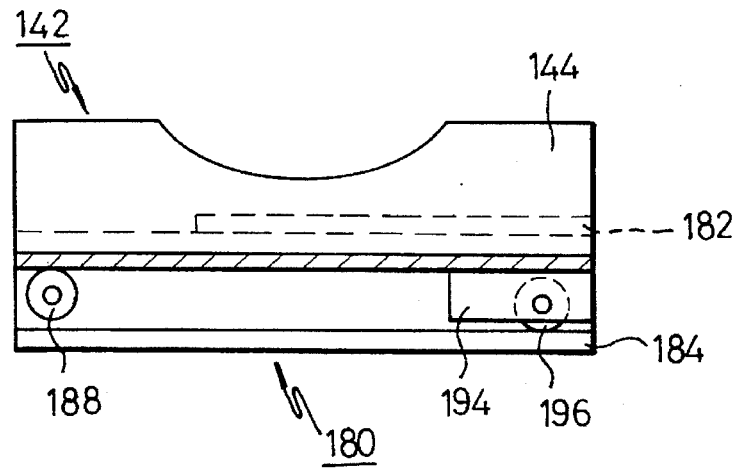
FIG. 10 is a view similar to FIG. 9 but showing the movable plate kept in a first position.

It can be appreciated that the stationary roller 188 carried on the vertical wall 186 of the guide rail 180 comes into a rolling contact with the underside of the lateral flange 192, while the moving roller 196 carried on the leg 194 of the movable plate 142 makes a rolling contact with the bottom flange 184 of the guide rail 180. This will enable the movable plate 142 to smoothly slide from the position as shown in FIG. 9 toward the position as illustrated in FIG. 10 and vice versa. As in the first embodiment described earlier, the movable plate 142 can be releasably locked in the first position by virtue of a lock mechanism to keep the fuel tank stably in the in-use position thereof.

Figure 11:
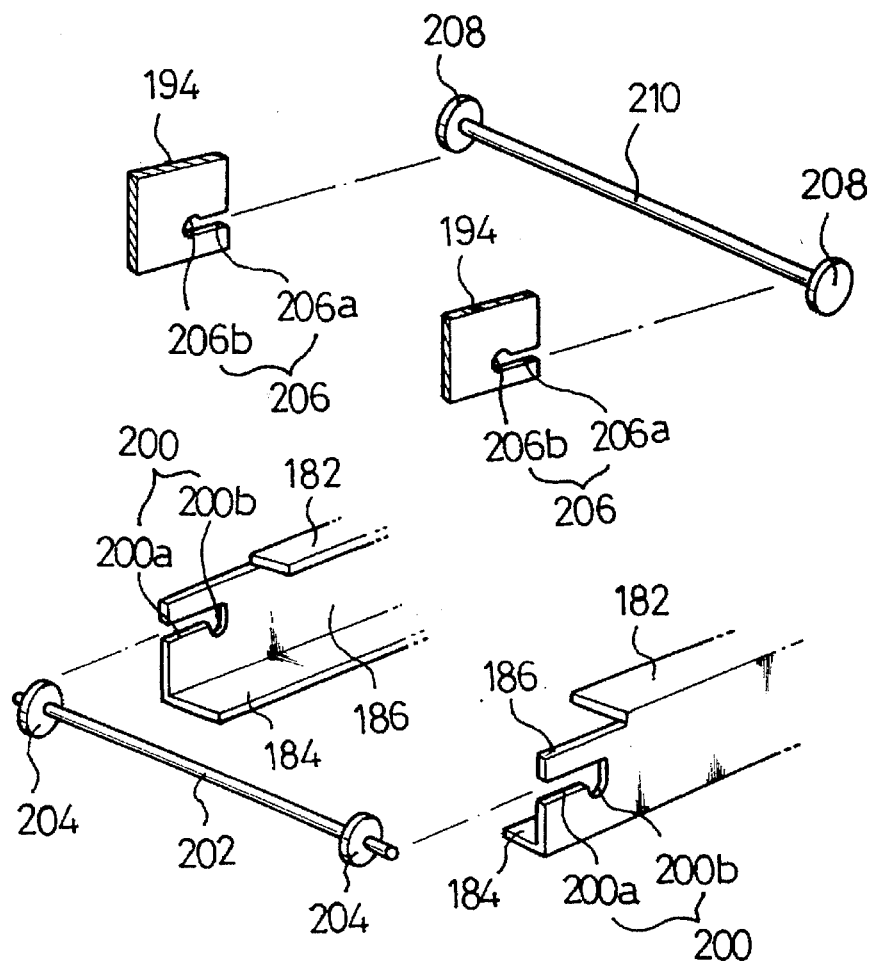
FIG. 11 shows a modification of the roller journalling structure shown in FIGS. 7 through 10.
Figure 12:
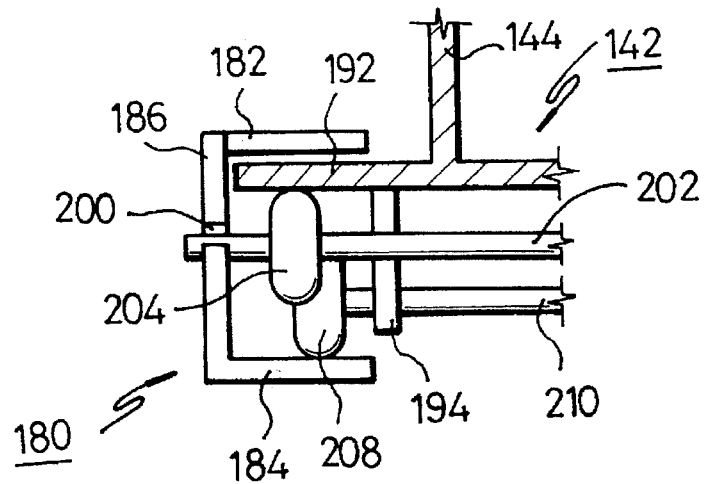
FIG. 12 is a partial view showing one of the guide rails and the movable plate illustrated in FIG. 11 but slidably assembled with each other.

Referring to FIG. 11, which shows a modification of the roller journalling structure, it can be noted that the vertical wall 186 of the respective guide rail 180 has at its rear end a first notch 200 on which a first axle 202 is rotatably journalled. The first notch 200 is constituted by a straight entrance 200a and an enlarged nest 200b. The first axle 202 is carrying at its opposite ends a pair of stationary rollers 204 which will come into a rolling contact with the underside of the movable plate 142. Similarly, the individual leg 194 of the movable plate 142 has at its front end a second notch 206 on which a second axle 210 is rotatably journalled. The second notch 206 is divided into a straight entrance 206a and an enlarged nest 206b. Moreover, the second axle 210 is carrying at its opposite ends a pair of moving rollers 208 which will come into a rolling contact with the bottom flange 184 of the guide rail 180. Thus the movable plate 142 can be caused to slide between the first position corresponding to the in-use position of the fuel tank and the second position corresponding to the out-of-use position.

While the invention has been shown and described with reference to certain preferred embodiments, it should be apparent to those skilled in the art that many changes and modifications may be made without departing from the scope of the invention as defined in the claims.

What is claimed is:

1. A fuel tank mount for a forklift truck adapted to mount a fuel tank on a counterweight in a manner that the fuel tank can be removed from an in-use position to an out-of-use position assuring an obstacle-free opening of a hood, comprising:

a fixed plate attached to the counterweight;

a pair of spaced-apart, parallel guide rails secured to the fixed plate to extend in a lengthwise direction of the forklift truck, each of the guide rails having a slot which runs substantially over a full length thereof;

a movable plate supporting the fuel tank thereon, the movable plate provided with a pair of legs slidably fitted into the slot of the guide rails, the movable plate capable of sliding movement with respect to the fixed plate between a first position corresponding to the in-use position of the fuel tank and a second position corresponding to the out-of-use position; and lock means for releasably locking the movable plate in the first position against relative sliding movement to the fixed plate.

2. The fuel tank mount for a forklift truck as recited in claim 1, wherein the movable plate has a pin hole formed therethrough and wherein the lock means includes a lock pin snugly fitted through the pin hole, a lock block protruding upwardly from the fixed plate and having a lock hole formed beneath and in a coaxial alignment with the lock pin, and a spring for urging the lock pin into engagement with the lock hole of the lock block.

3. The fuel tank mount for a forklift truck as recited in claim 2, wherein the lock pin is provided with a head lying above the movable plate when the lock pin is inserted through the pin hole and a split pin removably fitted across the lock pin with a predetermined spacing from the head to retain the spring between the movable plate and the split pin.

4. The fuel tank mount for a forklift truck as recited in claim 3, wherein the movable plate is provided with a head rest block projecting upwardly from the movable plate in the vicinity of the pin hole, the head rest block shaped and sized such that, when the lock pin is pulled away from the lock block and then rotated to a given angular position, the head of the lock pin is supported on the head rest block to keep the lock pin removed out of the lock hole.

5. The fuel tank mount for a forklift truck as recited in claim 4, wherein the lock block has a cam surface with which the lock pin comes into contact at its tip during a final process of sliding movement of the movable plate toward the first position, the cam surface so slanted as to gradually push up the lock pin against the spring until the lock pin reaches the lock hole at the end of a forward sliding movement of the movable plate.

6. The fuel tank mount for a forklift truck as recited in claim 1, further comprising stopper means for inhibiting the movable plate from backward sliding movement past the second position to prevent any detachment of the movable plate out of the guide rails.

7. The fuel tank mount for a forklift truck as recited in claim 6, wherein the stopper means includes a detent surface provided on the movable plate and a detent bolt affixed to the fixed plate for abutment with the detent surface when the movable plate is brought into the second position.

8. The fuel tank mount for a forklift truck as recited in claim 1, further comprising a bushing fixedly held in the slot of the respective guide rail and having a slide groove for accommodation of the respective leg of the movable plate in a slidable condition.

9. The fuel tank mount for a forklift truck as recited in claim 8, further comprising a retainer block affixed to the fixed plate to prevent any removal of the bushing from the slot of the respective guide rail.

10. The fuel tank mount for a forklift truck as recited in claim 8, wherein the respective leg of the movable plate has a free end of generally circular cross-section, the slide groove being of a configuration complementary to the free end of the respective leg.

11. The fuel tank mount for a forklift truck as recited in claim 8, wherein the respective leg of the movable plate has a free end of generally rectangular cross-section, the slide groove being of a configuration complementary to the free end of the respective leg.

12. The fuel tank mount for a forklift truck as recited in claim 8, wherein each of the guide rails has a top flange, a bottom flange extending in a spaced-apart, parallel relationship with respect to the top flange and a vertical wall interconnecting the top and bottom flanges together and wherein the bushing has a top flange, a bottom flange extending in a spaced-apart, parallel relationship with respect to the top flange and a vertical wall interconnecting the top and bottom flanges together.

13. The fuel tank mount for a forklift truck as recited in claim 1, wherein each of the guide rails is provided with a top flange having a cutout at its rear side, a bottom flange extending in a spaced-apart, parallel relationship with the top flange and a vertical wall interconnecting the top and bottom flanges together, the vertical wall carrying at its rear end portion a stationary roller which makes a rolling contact with an underside of the movable plate, each of the legs carrying a moving roller which comes into a rolling contact with the bottom flange of the respective guide rail.

14. The fuel tank mount for a forklift truck as recited in claim 13, wherein the movable plate has a pin hole formed therethrough and wherein the lock means includes a lock pin snugly fitted through the pin hole, a lock block protruding upwardly from the fixed plate and having a lock hole formed beneath and in a coaxial alignment with the lock pin, and a spring for urging the lock pin into engagement with the lock hole of the lock block.

15. The fuel tank mount for a forklift truck as recited in claim 14, further comprising stopper means for inhibiting the movable plate from backward sliding movement past the second position to prevent any detachment of the movable plate out of the guide rails.

16. The fuel tank mount for a forklift truck as recited in claim 1, wherein each of the guide rails is provided with a top flange having a cutout at its rear side, a bottom flange extending in a spaced-apart, parallel relationship with the top flange and a vertical wall interconnecting the top and bottom flanges together, the vertical wall having at its rear end a first notch for rotatably holding a first axle, the first axle carrying at its opposite ends a pair of stationary rollers which come into a rolling contact with an underside of the movable plate, each of the legs having at its front end a second notch for rotatably holding a second axle, the second axle carrying at its opposite ends a pair of moving rollers which make a rolling contact with the bottom flange of the respective guide rail.

17. The fuel tank mount for a forklift truck as recited in claim 16, wherein the movable plate has a pin hole formed therethrough and wherein the lock means includes a lock pin snugly fitted through the pin hole, a lock block protruding upwardly from the fixed plate and having a lock hole formed beneath and in a coaxial alignment with the lock pin, and a spring for urging the lock pin into engagement with the lock hole of the lock block.

18. The fuel tank mount for a forklift truck as recited in claim 17, further comprising stopper means for inhibiting the movable plate from backward sliding movement past the second position to prevent any detachment of the movable plate out of the guide rails.

\* \* \* \* \*